May 29, 1951
R. K. LOWMAN
2,554,711
DRAFT DEVICE FOR TRAILER HITCHES
Filed April 8, 1950
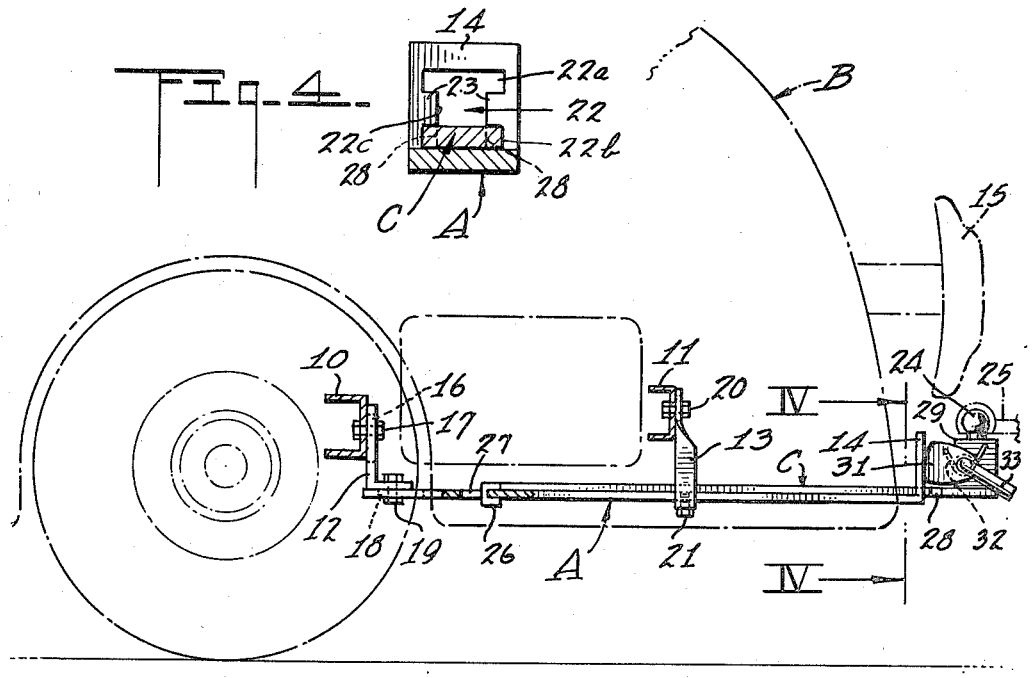
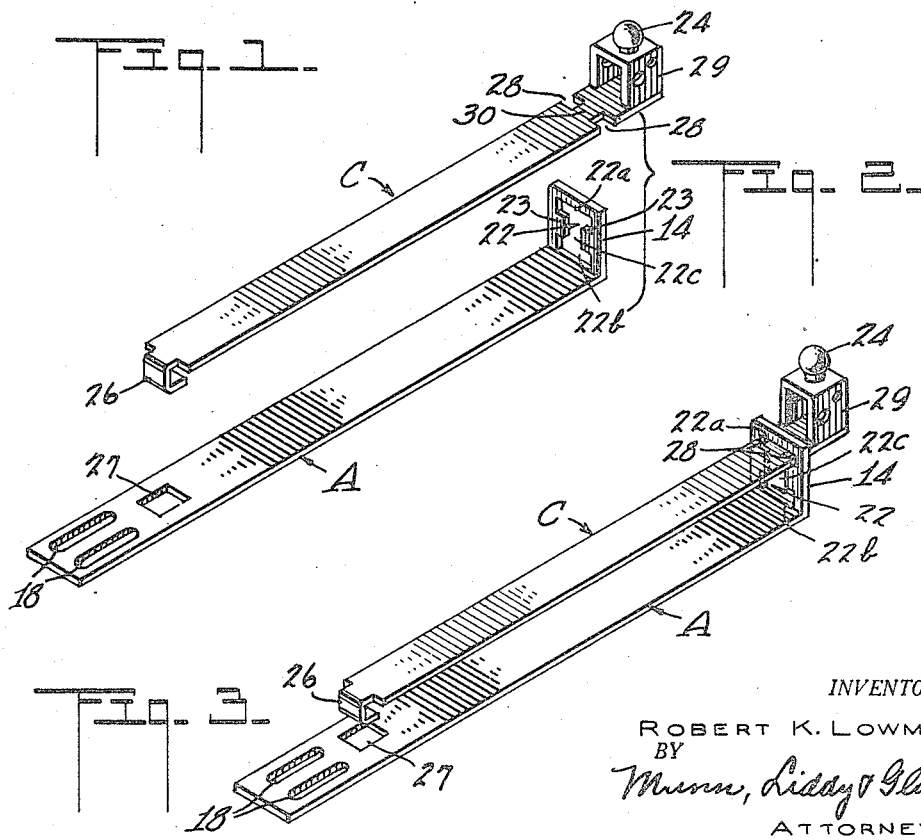
INVENTOR.
ROBERT K. LOWMAN
BY
Munn, Liddy & Glaccum
ATTORNEYS Patented May 29, 1951

2,554,711

UNITED STATES PATENT OFFICE 2,554,711

DRAFT DEVICE FOR TRAILER HITCHES

Robert Keith Lowman, Oroville, Calif.

Application April 8, 1950, Serial No. 154,785

4 Claims. (Cl. 280—33.44)

The present invention relates to improvements in a draft device for a trailer hitch. It consists of the combinations, constructions, and arrangement of parts, as hereinafter described and claimed.

Many of the trailer hitches as employed today for connecting trailers to towing vehicles are secured permanently to the vehicles and project rearwardly therefrom, regardless of whether or not trailers are being towed. This arrangement gives a rather unsightly appearance to the vehicle, especially when the latter is being used strictly as a passenger carrier.

An object of this invention is to provide a draft device that includes a pair of coacting bars, one of which is affixed permanently to the towing vehicle in a substantially out-of-sight position, while the other bar is removably coupled to the permanent bar when a trailer is to be towed.

Moreover, these bars may be attached to one another with great rapidity when establishing the draft device in operative position. Also, the removable bar may be easily detached from the permanent bar when its use is not required.

A still further object is to provide a device of the character described, which is simple in construction, durable and efficient for the purpose intended.

Other objects will appear as the specification continues, and the novel features will be pointed out in the claims hereunto appended.

Drawing

For a better understanding of this invention, reference should be had to the accompanying drawing, forming part of this application, in which:

Figure 1 is a side elevational view showing my draft device secured to the chassis of a vehicle, portions of the latter being illustrated in section, while fragmentary parts of the vehicle are disclosed in dot-dash lines;

Figure 2 is an isometric view of the two coacting bars of the draft device, disclosing them in separated relation;

Figure 3 is a similar view, but showing the bars being connected together; and

Figure 4 is a transverse sectional view taken along the line IV—IV of Figure 1.

While I have shown only the preferred form of my invention, it should be understood that various changes, or modifications, may be made within the scope of the annexed claims, without departing from the spirit thereof.

Detailed description

Referring to the drawing, I have shown a bar A, which is fastened to transverse frames 10 and 11 of a towing vehicle B by brackets 12 and 13, respectively. This bar is provided with an upstanding end 14 disposed forwardly of the rear bumper 15. While this bar is carried by the vehicle, it is substantially concealed from view. The bar A may be regarded as being permanently affixed to the vehicle; but, of course, may be removed therefrom.

In order to accommodate the bar A to various sizes and types of vehicles, the bracket 12 has been shown in the shape of an angle. The vertical leg of this angle bracket has slots 16 therein. Bolts 17 pass through these slots and secure the bracket 12 to the frame 10. Also, the forward end of the bar A is slotted at 18 through which bolts 19 extend, the upper ends of these bolts being anchored to the horizontal leg of the bracket 12. Thus the bar A may be adjusted vertically and longitudinally to bring the upstanding end 14 in the proper location.

The bracket 13 is made in the form of a stirrup, with its upper slotted ends secured to the frame 11 by bolts 20. This stirrup bracket has an intermediate portion of the bar A anchored thereto by a stud 21, or other suitable fastening means.

The upstanding end 14 of the permanent bar A has an I-shaped slot 22 fashioned therein. This slot defines upper and lower horizontal portions 22a and 22b, respectively, which are interconnected by a reduced vertical portion 22c. As clearly shown in Figure 4, the slot 22 defines tongues 23, which project toward one another but are separated by the width of the vertical slot portion 22c. The lower part of the horizontal slot portion 22b is disposed flush with the upper surface of the bar A.

It will be noted that a removable bar C carries a ball 24 to which a tongue 25 of a towed vehicle may be coupled in the usual manner. This bar has a width corresponding with the widths of the upper and lower slot portions 22a and 22b, respectively (see Figure 4). At the forward end of the bar C there is provided a downwardly and rearwardly-extending hook 26, the width of which is dimensioned for passing through the vertical slot portion 22c. This hook is adapted for projecting through an opening 27 provided in the forward section of the permanent bar A when the two bars are abutted together. Thereafter, retraction of the bar C will engage the hook with the bar A in the manner shown in Figure 1.

Notches 28 are formed in the rear part of the removable bar C just ahead of a block 29 that is welded, or otherwise secured to the trailing end of this bar. The ball 24 is fixed to the block 29 and rises therefrom. The section 30 of the bar C disposed between the notches 28 has a width for passing downwardly and upwardly through the vertical slot portion 22c disposed between the confronting ends of the tongues 23.

The block 29 has a pair of swingably-mounted cams 31 arranged on opposite sides thereof, which are disposed to bear against the upstanding end 14 of the removable bar C. In Figure 1, I show a spring 32 designed for swinging the cams 31 in a counter-clockwise direction so as to retract the bar C endwise relative to the bar A. This will hold the hook 26 in engagement with the bar A; and, also, prevent chattering of the bars. A handle 33 is provided for swinging the cams into inoperative position to allow the bar C to be removed from the bar A.

Summary

The assembly and operation of my draft device for a trailer hitch is summarized briefly as follows:

As the first step, the angle bracket 12 and stirrup bracket 13 are secured to the transverse frames 10 and 11, respectively. Next, the bar A is inserted through the stirrup bracket and its forward end connected to the angle bracket 12 by the bolts 19. The stud 21 is inserted through the stirrup bracket so as to fasten the bar A thereto. The brackets 12—13 are adjusted so as to present the bar A at the proper elevation. Now the mechanic adjusts the bar A so that its upturned end 14 will be positioned forwardly of the rear bumper 15, as indicated in Figure 1.

The bar C is inserted endwise through the upper horizontal portion 22a of the I-shaped slot 22, as suggested in Figure 3, with the hook 26 passing through the vertical portion 22c of this slot. When the notches 28 of the bar C register with the tongue 23, the removable bar C is moved downwardly against the permanent bar A. During this movement, the hook 26 is inserted into the opening 27.

At this time the bar C will project through the lower horizontal portion 22b of the slot 22, as shown in Figure 4. The mechanic retracts the bar C until the notches 28 are arranged rearwardly of the upstanding end 14 of the permanent bar (see Figure 1). Thus the forward end of the bar C will have its hook 26 engaging with the bar A, while its rear portion will be confined beneath the tongues 23. The cam 31 is swung into operative position, as shown in Figure 1, and the draft device is fully assembled. At any desired time, the tongue 25 of the trailer is attached to the ball 24 in the conventional manner.

When the automobilist desires to drive the vehicle B without displaying the trailer hitch, the cam 31 is swung in a clockwise direction, thus allowing the bar C to be pushed forwardly until the hook 26 is disengaged from the opening 27. Upon bringing the notches 28 in registry with the tongues 23, the bar C may be elevated relative to the bar A, as disclosed in Figure 3. Now the bar C can be retracted, with the hook 26 passing rearwardly through the vertical portion 22c of the I-shaped slot 22. The bar A remains permanently attached to the vehicle B and is substantially concealed from view.

It will be noted that the removable drawbar C can be detached without requiring the removal of bolts or pins. Moreover, my draft device can be used on either end of the vehicle B. While Figure 1 illustrates the device arranged at the rear of the vehicle, it is obvious that it may be positioned at the front thereof, in which case the drawbar C can be removed or replaced in the same manner previously described.

Many cars on the market now have the license plate located in the center of the rear bumper 15. My device will not obscure any part of this plate while the car is used as a passenger car.

I claim:

1. In a draft device for a trailer hitch: a permanent bar secured to a vehicle to extend lengthwise thereof, and having an upstanding end provided with an I-shaped slot therein; this slot defining horizontal upper and lower portions interconnected by a vertical slot portion; this slot further defining spaced-apart tongues arranged in confronting relation with one another, with the space therebetween providing the vertical slot portion; a removable bar insertable endwise through the upper horizontal slot portion; the removable bar having notches in opposing sides thereof to receive the tongues, with the section of the bar between the notches dimensioned for passage downwardly through the vertical slot portion when the notches register with the tongues; the removable bar being movable into the lower horizontal slot portion, at which time the removable bar may be retracted rearwardly and confined under the tongues, with the notches out of registration with the tongues; and means for anchoring the bars together to limit rearward retraction of the removable bar relative to the permanent bar.

2. In a draft device for a trailer hitch: a permanent bar secured to a vehicle to extend lengthwise thereof, and having an upstanding end provided with an I-shaped slot therein; this slot defining horizontal upper and lower portions interconnected by a vertical slot portion; this slot further defining spaced-apart tongues arranged in confronting relation with one another, with the space therebetween providing the vertical slot portion; a removable bar insertable endwise through the upper horizontal slot portion; the removable bar having notches in opposing sides thereof to receive the tongues, with the section of the bar between the notches dimensioned for passage downwardly through the vertical slot portion when the notches register with the tongues; the removable bar being movable into the lower horizontal slot portion, at which time the removable bar may be retracted rearwardly and confined under the tongues, with the notches out of registration with the tongues; the permanent bar having an opening therein; and a hook on the removable bar disposed for insertion through that opening to limit rearward retraction of the removable bar relative to the permanent bar; the hook having a width dimensioned for passing through the vertical slot portion.

3. In a draft device for a trailer hitch: a permanent bar secured to a vehicle to extend lengthwise thereof, and having an upstanding end provided with an I-shaped slot therein; this slot defining horizontal upper and lower portions interconnected by a vertical slot portion;

this slot further defining spaced-apart tongues arranged in confronting relation with one another, with the space therebetween providing the vertical slot portion; a removable bar insertable endwise through the upper horizontal slot portion; the removable bar having notches in opposing sides thereof to receive the tongues, with the section of the bar between the notches dimensioned for passage downwardly through the vertical slot portion when the notches register with the tongues; the removable bar being movable into the lower horizontal slot portion, at which time the removable bar may be retracted rearwardly and confined under the tongues, with the notches out of registration with the tongues; means for anchoring the bars together to limit rearward retraction of the removable bar relative to the permanent bar; and means engageable with the upstanding end of the permanent bar for releasably retaining the removable bar in retracted position.

4. In a draft device for a trailer hitch: a permanent bar secured to a vehicle to extend lengthwise thereof, and having an upstanding end provided with an I-shaped slot therein; this slot defining horizontal upper and lower portions interconnected by a vertical slot portion; this slot further defining spaced-apart tongues arranged in confronting relation with one another, with the space therebetween providing the vertical slot portion; a removable bar insertable endwise through the upper horizontal slot portion; the removable bar having notches in opposing sides thereof to receive the tongues, with the section of the bar between the notches dimensioned for passage downwardly through the vertical slot portion when the notches register with the tongues; the removable bar being movable into the lower horizontal slot portion, at which time the removable bar may be retracted rearwardly and confined under the tongues, with the notches out of registration with the tongues; the widths of the lower horizontal slot portion and the removable bar being coextensive, whereby that bar will be held against lateral movement relative to the permanent bar when the removable bar is confined beneath the tongues.

ROBERT KEITH LOWMAN.

REFERENCES CITED

The following references are of record in the file of this patent:

UNITED STATES PATENTS

| Number | Name | Date |
|---|---|---|
| 1,068,334 | Goodhue | July 22, 1913 |
| 1,476,647 | Rumsky | Dec. 4, 1923 |
| 2,485,743 | Koback | Oct. 25, 1949 |